US011072840B2

(12) United States Patent
Villanueva Berindoague et al.

(10) Patent No.: US 11,072,840 B2
(45) Date of Patent: Jul. 27, 2021

(54) USE OF HYDROPHOBICALLY ASSOCIATING COPOLYMERS AS BINDERS FOR PELLETIZING METAL CONTAINING ORES

(71) Applicant: BASF SE, Ludwigshafen (DE)

(72) Inventors: Adrian Mauricio Villanueva Berindoague, Ludwigshafen (DE); Alexej Michailovski, Ludwigshafen (DE); Gregor Brodt, Ludwigshafen (DE); Sylvia Von Krog, Ludwigshafen (DE); Dominic Rene Bechen, Ludwigshafen (DE); Rainer Packe-Wirth, Trostberg (DE); Shane Hoff, Tucson, AZ (US)

(73) Assignee: BASF SE, Ludwigshafen (DE)

( * ) Notice: Subject to any disclaimer, the term of this patent is extended or adjusted under 35 U.S.C. 154(b) by 485 days.

(21) Appl. No.: 15/754,325

(22) PCT Filed: Sep. 1, 2016

(86) PCT No.: PCT/EP2016/070671
§ 371 (c)(1),
(2) Date: Feb. 22, 2018

(87) PCT Pub. No.: WO2017/037207
PCT Pub. Date: Mar. 9, 2017

(65) Prior Publication Data
US 2019/0010577 A1    Jan. 10, 2019

(30) Foreign Application Priority Data

Sep. 2, 2015  (EP) .................................... 15183527

(51) Int. Cl.
| C22B 1/244 | (2006.01) |
| C22B 1/00 | (2006.01) |
| C08F 216/14 | (2006.01) |
| C22B 1/24 | (2006.01) |
| C09J 133/26 | (2006.01) |

(52) U.S. Cl.
CPC .......... C22B 1/244 (2013.01); C08F 216/145 (2020.02); C08F 216/1425 (2020.02); C08F 216/1433 (2020.02); C08F 216/1441 (2020.02); C09J 133/26 (2013.01); C22B 1/00 (2013.01); C22B 1/2406 (2013.01)

(58) Field of Classification Search
CPC .......... C22B 1/24; C22B 1/244; C22B 1/2406; C08F 216/145; C08F 216/1441; C08F 216/1433; C08F 216/1425; C08F 290/062
See application file for complete search history.

(56) References Cited

U.S. PATENT DOCUMENTS

| 4,684,549 A | 8/1987 | Allen et al. |
| 4,728,537 A | 3/1988 | Allen et al. |
| 4,751,259 A | 6/1988 | Roe et al. |
| 4,767,449 A | 8/1988 | Rosen et al. |
| 4,802,914 A | 2/1989 | Rosen et al. |
| 4,892,916 A * | 1/1990 | Hawe ...................... A61L 15/60 526/304 |
| 5,000,783 A | 3/1991 | Dingeman et al. |
| 5,112,391 A | 5/1992 | Owen et al. |
| 5,171,361 A | 12/1992 | Dingeman et al. |
| 5,294,250 A | 3/1994 | Panigraphy et al. |
| 6,293,994 B1 * | 9/2001 | Field ..................... C22B 1/2413 75/321 |
| 8,409,322 B2 | 4/2013 | Zakosek et al. |
| 2012/0129739 A1 | 5/2012 | Pfeuffer et al. |

FOREIGN PATENT DOCUMENTS

| CA | 1302095 C | 6/1992 | |
| CA | 2760734 A1 * | 11/2010 | ............ C08F 220/56 |
| CN | 1116242 A | 2/1996 | |
| CN | 1962898 A | 5/2007 | |
| CN | 102177263 A | 9/2011 | |
| CN | 105039688 A | 11/2015 | |
| EP | 0172723 A2 * | 2/1986 | ................ C08J 3/03 |
| EP | 0203855 A2 | 12/1986 | |
| EP | 0225171 A2 | 6/1987 | |
| EP | 0288150 A1 | 10/1988 | |
| EP | 0376713 A2 | 7/1990 | |
| EP | 0705854 A1 | 4/1996 | |
| EP | 0705854 A1 * | 4/1996 | ............. C07C 69/54 |
| JP | 2-99574 A | 4/1990 | |
| JP | 2004-76131 A | 3/2004 | |
| JP | 2004076131 A * | 3/2004 | |
| JP | 2012-527505 A | 11/2012 | |
| JP | 2013-501112 A | 1/2013 | |
| JP | 2013-510199 A | 3/2013 | |

(Continued)

OTHER PUBLICATIONS

Google patents translation of JP-2004076131-A (2004, 9 pages).*
Claremboux (Role of Flocculation and Dispersion in Pelletization of Iron Ore. Michigan Technological University. 2020, 72 pages).*
Office Action dated Nov. 22, 2019 in corresponding Korean Patent Application No. 10-2018-7008424, 8 pages.
International Search Report dated Nov. 11, 2016, in PCT/EP2016/070671, filed Sep. 1, 2016.
Japanese Office Action dated Apr. 17, 2019 in Patent Application No. 2018-510745, 13 pages (with English translation).
Combined Chinese Office Action and Search Report dated Nov. 23, 2018 in Patent Application No. 201680049596.1 (with English language translation and English translation of categories of cited documents).

(Continued)

Primary Examiner — Brieann R Johnston
(74) Attorney, Agent, or Firm — Grüneberg and Myers PLLC

(57) ABSTRACT

The present invention relates to the use of hydrophobically associative copolymers as binders for pelletizing metal containing ores such as iron containing ores. The copolymers comprise monomer units derived from at least one hydrophobically as sociative monomer, preferably at least one unsaturated hydrophobically associating monomer.

17 Claims, No Drawings

(56) References Cited

FOREIGN PATENT DOCUMENTS

| KR | 10-2012-0029434 A | 3/2012 |
|----|-------------------|--------|
| KR | 10-2015-0097654 A | 8/2015 |
| WO | WO 2010/058111 A1 | 5/2010 |
| WO | WO 2013/010629 A1 | 1/2013 |
| WO | WO 2014/095608 A2 | 6/2014 |

OTHER PUBLICATIONS

European Office Action dated Apr. 2, 2020 in Patent Application No. 16 760 069.1, 4 pages.

* cited by examiner

USE OF HYDROPHOBICALLY ASSOCIATING COPOLYMERS AS BINDERS FOR PELLETIZING METAL CONTAINING ORES

The present invention relates to the use of hydrophobically associating copolymers, as binders for pelletizing metal containing ores such as iron containing ores.

BACKGROUND OF INVENTION

A pelletizing process is a compressionless agglomeration of a material in the form of pellets. A variety of different materials may undergo such a process, including chemicals, metal containing ores such as iron ores, animal feed, and the like.

For example, iron ore pellets are spheres of typically 8 to 18 mm which are used as the raw material for blast furnaces. They typically contain at least 60% to 70% iron ore and various additional materials adjusting the chemical composition and the metallurgic properties of the pellets.

In a direct reduction process, the pellets having a high, uniform mechanical strength and high abrasive strength increase production of sponge iron when using the same amount of fuel. Iron ore pellets may also be less vulnerable to degradation during transportation due to higher abrasion resistance. Moreover, pellets allow for an easier handling.

The process of pelletizing combines mixing of the raw material, forming the pellet and a thermal treatment baking the soft raw pellet to a hard sphere. The raw material is rolled into a ball and then fired in a kiln to sinter the particles into a hard sphere. The configuration of metal containing ore pellets as packed spheres allows air to flow between the pellets while decreasing the resistance to air that flows up through the layers of material during the smelting. In contrast, the configuration of metal containing ore powder (instead of metal containing ore pellets) in a blast furnace is more tightly packed and prevents the air flow, choking the furnace.

The additional materials that may be added for the pelletizing of a metal containing ore, such as an Fe containing ore, may include additives to control the basicity. Examples of additonal materials include limestone and/or dolomite, and solid fuel additives such as coal/coke breeze. Furthermore, a binder may be added. In many cases, Bentonite, an absorbent aluminium phyllosilicate, is used as a binder since its use typically provides pellets with the required mechanic properties, e.g. wet strength, dry strength and drop number. Bentonite swells up on contact with water and forms a viscous sticky mass that is used as the active binder. However, the Bentonite is not burned off during the firing process and thus, residual Bentonite or other silicon-based derivatives thereof formed during sintering remain, which is undesirable.

Other binders, such as the organic binder Alcotac® FE13 (BASF SE) comprising a copolymer of acrylamide and acrylic acid, or cellulose-based binders, are also known to be suitable for the metal-containing ore pelletization. The advantage of organic binders is that they are burned off when sintered and thus, the remaining metal pellets are free from residual organic binder. However, the prior art organic binders alone do typically not provide the same desired mechanic properties to the metal containing pellets compared to Bentonite. Thus, compositions comprising Bentonite together with other binders are oftentimes used as binder.

WO2013010629 (A1) describes binder compositions for pelletization of fine mineral particles comprising a) at least one colloid agent which exerts a cohesive force on the mineral particles forming the pellets, and b) at least one synthetic polymer which disperses mineral particles evenly in the pellets.

U.S. Pat. No. 4,684,549 discloses a process in which iron ore pellets are made by addition of binder comprising organic polymer or copolymer of sodium acrylate and acrylamide.

U.S. Pat. No. 4,728,537 discloses organic polymer binders like cationic polymers from diallyl dimethyl ammonium chloride and quaternised dialkylaminoalkyl (methyl) acrylates and quaternised dialkylaminoalkyl (methyl) acrylamides.

U.S. Pat. No. 4,767,449 relates to a process of agglomerating, comprising a two component binder system, a first component being a binding polymer and a second one being clay. The polymer or copolymers is a derivative from monomer units of acrylamide, sodium acrylate, vinyl acetate and poly (ethylene oxide). The polymer can also be a polysaccharide, e.g. carboxymethyl cellulose, guar gum and hydroxyethyl cellulose.

U.S. Pat. No. 5,294,250 discloses a self-fluxing clay free binder composition comprising in admixture of a carrier selected from the group of synthetic or natural magnesium and/or calcium mineral such as calcite, olivine, magnesite and dolomite, and one organic enhancer consisting of a natural polysaccharide of high viscosity, e.g. guar gum.

Overall, there is still a need to reduce the amount of Bentonite in metal-containing ore pellets while at least maintaining desired mechanic properties of the metal containing pellet.

There is also still a need to provide other organic binders for the pelletizing of metal containing ores to afford metal containing ore pellets with desirable mechanic properties.

It is thus an object of the present invention to produce metal-containing ore pellets that provide desired mechanic properties by using organic binders.

SUMMARY

The object was solved by using copolymer, also called a hydrophobically associating copolymer for pelletizing of metal containing ore.

Further, the object was solved by a composition for metal containing ore pelletizing comprising i. a hydrophobically associating copolymer, preferably comprising monomer units derived from at least one anionic monoethylenically unsaturated, hydrophilic monomer A, at least one uncharged, monoethylenically unsaturated hydrophilic monomer B, and at least one unsaturated, hydrophobically associating monomer C; and ii. a pelletisation aid and/or a water soluble treatment polymer, wherein the pelletizing aid is a water soluble material selected from the group consisting of sodium carbonate, sodium bicarbonate, sodium silicate, sodium phosphate, sodium stearate, sodium benzoate, sodium tartrate, sodium oxalate, sodium citrate, sodium acetate, the corresponding ammonium, potassium, calcium and magnesium salts of the preceding sodium salts, urea and calcium oxide, and preferably is sodium carbonate; and wherein the water sobuble treatment polymer has molecular weight of from about 1,000 to about 20,000 and is a synthetic polymer formed by polymerisation of water soluble ethylenically unsaturated anionic monomer or water soluble ethylenically unsaturated monomer blend containing at least 50% by weight anionic monomer, and preferably is a homopolymer of acrylic acid.

DETAILED DESCRIPTION

The present invention relates to the use of a copolymer, herein also called a hydrophobically associating copolymer for pelletizing of metal containing ore. A hydrophobically associating coplymer comprises monomer units which impart hydrophobically associating properties.

In the ideal case, the copolymers used in accordance with the invention should be miscible with water in any ratio. According to the invention, however, it is sufficient when the copolymers are water-soluble at least at the desired use concentration and at the desired pH. In general, the solubility of the copolymer in water at room temperature under the use conditions should be at least about 10 g/l or at least 25 g/l.

In a preferred embodiment, the molecular weight of the copolymer is at least 300,000 Da, preferably at least 500,000 Da and even more preferably at least 1,000,000 Da. The person skilled in the art will be aware how to determine the molecular weight of a copolymer, which is typically determined as an average, preferably as the mass average molecular weight ($M_w$) or as a number-average molecular weight (Ma). The molecular weight of the copolymer may be determined for example by permeation chromatography which is particularly suitable for the determination of the molecular weight for copolymers having a molecular weight up to about 1 MDa.

In a preferred embodiment, the amount of copolymer used in the intimate mixture for pelletizing of the metal containing ore is generally from about 0.005% wt. to about 0.1% wt., and preferably from about 0.01% wt to about 0.1% wt, based on the weight of the intimate mixture comprising ore, copolymer and moisture. The amount of moisture will vary according to the ore and the process but is typically in the range of from about 7 to about 15%, or from about 8 to about 12% by weight based on the weight of the intimate mixture. Some or all of this moisture may be introduced with the binder copolymer and/or an optional treatment polymer or by a deliberate addition of water, but often all the moisture is present in the ore and all the additives, such as the copolymer, are added dry.

In a preferred embodiment, the hydrophobically associating copolymer comprises monomer units derived from at least one unsaturated hydrophobically associating monomer C.

The hydrophobically associating monomers C comprise, as well as preferably an ethylenically unsaturated group, a hydrophobic group which, after the polymerization, is responsible for the hydrophobic association of the copolymer formed. They preferably further comprise hydrophilic molecular components which impart a certain water solubility to the monomer.

In a particularly preferred embodiment, the at least one of the hydrophobically associating monomers C is a monomer of the general formula (I)

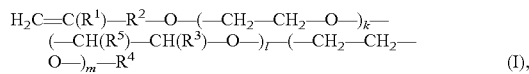

(I), wherein
k: is a number from 10 to 150, and preferably from 20 to 30;
l: is a number from 5 to 20;
m: is a number from 0 to 30;
$R^1$: is H or methyl;
$R^2$: is independently a single bond or a divalent linking group selected from the group consisting of —$(CH_2)_n$— and —O—$(CH_2)_{n'}$—, where n is a natural number from 1 to 6 and n' is a natural number from 2 to 6;
$R^3$ and $R^5$: are each independently hydrogen or a hydrocarbyl radical, preferably a hydrocarbyl radical having 1-6 carbon atoms, or more preferably a hydrocarbyl radical having 1-3 carbon atoms or an ether group of the general formula —$CH_2$—O—$R^{3'}$ where $R^{3'}$ is a hydrocarbyl radical having at least 2 carbon atoms; with the proviso that the sum total of the carbon atoms in all hydrocarbyl radicals $R^3$ or $R^{3'}$ and $R^5$ is in the range from 10 to 50 and preferably in the range from 20 to 40,
$R^4$: is independently H or a hydrocarbyl radical having 1 to 4 carbon atoms.

In a preferred embodiment, $R^1$ is H.

The —$(CH_2)_n$— and —$(CH_2)_{n'}$— groups of $R^2$ may be straight-chained or branched. In a preferred embodiment, the —$(CH_2)_n$— and —$(CH_2)_{n'}$— groups are straight-chained.

In a preferred embodiment, the $R^2$ group is —$(CH_2)_n$—.

In a preferred embodiment, n is 1, 2 or 3. In a more preferred embodiment, n is 1.

In another preferred embodiment, each $R^2$ group is a —O—$(CH_2)_{n'}$— group.

In another preferred embodiment, n' is 2, 3, or 4. In a more preferred embodiment, n' is 4.

In a particularly preferred embodiment, each $R^2$ is independently selected from —$CH_2$— and —O—$CH_2$—$CH_2$—$CH_2$—$CH_2$—, and preferably is —O—$CH_2$—$CH_2$—$CH_2$—$CH_2$—.

The monomers C of formula (I) additionally have a polyalkyleneoxy radical consisting of —(—$CH_2$—$CH_2$—O—)$_k$, —(—$CH(R^5)$—$CH(R^3)$—O—)$_l$ and optionally —(—$CH_2$—$CH_2$—O—)$_m$ units, the units being arranged in block structure in the sequence shown in formula (I). The transition between the blocks may be abrupt or else continuous.

In a preferred embodiment, the number of ethyleneoxy units k is a number from 12 to 100, more preferably 15 to 80, even more preferably 20 to 30 and even more preferably form 22 to 26 and even more preferably from 23 to 26. It will be apparent to the person skilled in the art in the field of polyalkylene oxides that the numbers mentioned are mean values of distributions.

In a preferred embodiment, $R^3$ is independently a hydrocarbyl radical having at least 2 carbonatoms and preferably is a hydrocarbyl having 2 to 14 carbon atoms, more preferably 2 to 4, and even more preferably having 2 or 3 carbon atoms. The hydrocaroyl radical may be an aliphatic and/or aromatic, linear or branched carbon radical.

In a preferred embodiment, $R^3$ is selected from ethyl, n-propyl, n-butyl, n-pentyl, n-hexyl, n-heptyl, n-octyl, n-nonyl or n-decyl and phenyl. In a more preferred embodiment, $R^3$ is selected from n-propyl, n-butyl, n-pentyl.

In a particularly preferred embodiment, $R^3$ is selected from ethyl or n-propyl. Thus, in a preferred embodiment, the —(—$CH_2$—$CH(R^3)$—O—)$_l$ block in formula (I) is a polybutyleneoxy block or a polypentyleneoxy block.

In another preferred embodiment, $R^3$ may is an ether group of the general formula —$CH_2$—O—$R^{3'}$.

In a preferred embodiment, $R^{3'}$ is an aliphatic and/or aromatic, linear or branched hydrocarbyl radical having at least 2 carbon atoms. In a preferred embodiment, $R^{3'}$ comprises from 2 to 10 carbon atoms and more preferably at least 3 carbon atoms. In another preferred embodiment, $R^{3'}$ is selected from n-propyl, n-butyl, n-pentyl, n-hexyl, 2-ethylhexyl, n-heptyl, n-octyl, n-nonyl, n-decyl or phenyl.

It will be apparent to the person skilled in the art in the field of polyalkylene oxides that the orientation of the hydrocarbyl radicals $R^3$ may depend on the conditions in the alkoxylation, for example on the catalyst selected for the alkoxylation in the polymerisation reaction of the copolymer of the present invention. The alkyleneoxy groups can thus be incorporated into the monomer C in the orientation —($-CH_2-CH(R^3)-O-$)— or else the inverse orientation —($-CH(R^3)-CH_2-O-$)$_l$—. The representation in formula (I) shall therefore not be regarded as being restricted to a particular orientation of the $R^3$ group.

The number of alkyleneoxy units l is a number from 5 to 20 and preferably from 8.5 to 17.25, with the proviso that the sum total of the carbon atoms in all hydrocarbyl radicals $R^3$ or $R^{3'}$ is in the range from 20 to 40 and preferably from 25.5 to 34.5. If the $R^3$ radicals are an ether group —$CH_2$—O—$R^{3'}$, the proviso applies that the sum total of the hydrocarbyl radicals $R^{3'}$ is in the range from 20 to 40 and preferably from 25.5 to 34.5, not including the carbon atom in the linking —$CH_2$—O— group in —$CH_2$—O—$R^{3'}$.

A preferred embodiment relates to an above-described copolymer comprising a monomer C wherein $R^3$ is ethyl and l is a number from 12.75 to 17.25, preferably 13 to 17, and more preferably 14 or 16. A further preferred embodiment relates to an above-described copolymer comprising a monomer C where $R^3$ is n-propyl and l is a number from 8.5 to 11.5, preferably 9 to 11, for example 10 or 11. It will be apparent to the person skilled in the art in the field of polyalkylene oxides that the numbers mentioned are mean values of distributions.

The optional block —($-CH_2-CH_2-O-$)$_m$ is a polyethyleneoxy block. The number of ethyleneoxy units m is a number from 0 to 15, preferably from 0 to 10, more preferably from about 0.1 to about 10, more preferably from 0.1 to about 5, even more preferably from about 0.5 to about 5 and most preferably from about 0.5 to about 2.5. It will be apparent to the person skilled in the art in the field of polyalkylene oxides that the numbers mentioned are mean values of distributions.

In a preferred embodiment, $R^4$ is selected from H, methyl and ethyl. In a more preferred embodiment, $R^4$ is selected from H or methyl. In a particularly preferred embodiment, $R^4$ is H.

In another preferred embodiment, $R^5$ is hydrogen.

In the monomers C of the formula (I), a terminal, monoethylenic group is joined to a polyalkyleneoxy group with block structure, more specifically first to a hydrophilic block having polyethyleneoxy units and the latter in turn to a second hydrophobic block formed from alkyleneoxy units, preferably at least butyleneoxy units or units of higher alkylene oxides and more preferably from butyleneoxy or pentyleneoxy units. The second block may have a terminal —$OR^4$ group, especially an OH group. The end group need not be etherified with a hydrocarbyl radical for hydrophobic association; instead, the second block —($-CH_2-CH(R^3)-O-$)$_l$ itself having the $R^3$ or $R^{3'}$ radicals may be responsible for the hydrophobic association of the copolymers prepared using the monomers C. Etherification is just one option which can be selected by the person skilled in the art according to the desired properties of the copolymer.

It will be apparent to the person skilled in the art in the field of polyalkyleneoxy block copolymers that the transition between the two blocks, according to the method of preparation, may be abrupt or else continuous. In the case of a continuous transition, there is a transition zone comprising monomers of both blocks between the blocks. If the block boundary is fixed in the middle of the transition zone, the first block —($-CH_2-CH_2-O-$)$_k$ may correspondingly still have small amounts of —($-CH_2-CH(R^3)-O-$)— units and the second block —($-CH(R^5)-CH(R^3)-O-$)$_l$ small amounts of —($-CH_2-CH_2-O-$)— units, in which case these units, however, are not distributed randomly over the block but are arranged within the transition zone mentioned. More particularly, the optional third block (—$CH_2$—$CH_2$—O—)$_m$ may have small amounts of units —($-CH_2-CH(R^3)-O-$)—.

Thus, monomer C of formula (I) comprises (—$CH_2$—$CH_2$—O—)$_k$, (—$CH(R^5)-CH(R^3)-O-$)$_l$ and optionally —($-CH_2-CH_2-O-$)$_m$ units which are arranged in block structure in the sequence shown in formula (I). "Block structure" in the context of the present invention means that the blocks are formed from the corresponding units to an extent of at least 85 mol %, preferably to an extent of at least 90 mol %, more preferably to an extent of at least 95 mol %, based on the total amount of the respective block. This means that the blocks, as well as the corresponding units, may have small amounts of other units (especially other polyalkyleneoxy units). More particularly, the optional polyethyleneoxy block —($-CH_2-CH_2-O-$)$_m$ comprises at least 85 mol %, preferably at least 90 mol %, based on the total amount of the block, the unit (—$CH_2$—$CH_2$—O—). More particularly, the optional polyethyleneoxy block —($-CH_2-CH_2-O-$)$_m$ consists of 85 to 95 mol % of the unit (—$CH_2$—$CH_2$—O—) and of 5 to 15 mol % of the unit (—$CH(R^5)-CH(R^3)-O-$).

In a preferred embodiment, k, l and m are selected as follows:
k: is a number from 23 to 26;
l: is a number from 8.5 to 17.25; and
m: is a number from 0 to 15.

In a particularly preferred embodiment of formula (I),
k: is a number from 23 to 26;
l: is a number from 12.75 to 17.25;
m: is a number from 0 to 15, preferably 0 or preferably 0.5 to 10;
$R^1$: is H;
$R^2$: is a divalent linking group —O—$(CH_2)_{n'}$— where n' is 4;
$R^3$: is independently a hydrocarbyl radical having 2 carbon atoms; and
$R^4$: is H; and
$R^5$: is H.

In another particularly preferred embodiment of formula (I),
k: is a number from 23 to 26;
l: is a number from 8.5 to 11.5;
m: is a number from 0 to 15;
$R^1$: is H;
$R^2$: is a divalent linking group —O—$(CH_2)_n$— where n' is 4;
$R^3$: is a hydrocarbyl radical having 3 carbon atoms; and
$R^4$: is H; and
$R^5$: is H.

In another embodiment, the monomer C of formula (I) in the copolymer is a mixture of a monomer C of formula (I) wherein m is 0 and a monomer C of the formula (I) wherein m is 1 to 15, preferably 1 to 10. In a preferred embodiment, the weight ratio of the monomer C of the formula (I) wherein m is 0 and the monomer C of the formula (I) wherein m is 1 to 15, preferably 1 to 10, is in the range from 19:1 to 1:19, preferably in the range from 9:1 to 1:9. This mixture of monomer C of the formula (I) wherein m is 0 and monomer C of the formula (I) wherein m is 1 to 15 more preferably gives rise to a mean value (averaged over all monomers C in the copolymer) for m from about 0.1 to about 10, preferably from about 0.1 to about 5, more preferably from about 0.5 to about 5 and even more preferably from about 0.5 to about 2.5.

Methods for preparing monomers C of formula (I) are for example described in WO 2014/095608, which is incorporated herein by reference.

In another preferred embodiment, the monoethylenically unsaturated water-soluble monomer C is selected from the group of

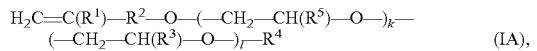

(IA),

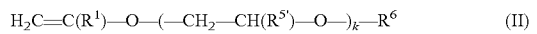

(II)

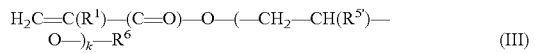

(III)

(IV)

(V)

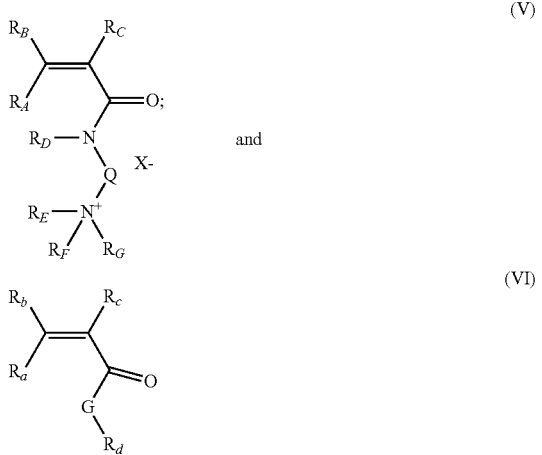

(VI)

wherein $R^1$, $R^2$, $R^3$, $R^4$, k and l of formula (IA), (II), and (III) may be selected as defined above for formula (I).

In the $-(-CH_2-CH(R^{5'})-O-)_k$ block of formula (IA), (II) and (III), each $R^{5'}$ is independently H, methyl or ethyl, preferably H or methyl. In a preferred embodiment at least 50 mol % of the $R^{5'}$ radicals are H. Preferably at least 75 mol % of the $R^{5'}$ radicals are H, more preferably at least 90 mol %, and they are most preferably exclusively H. The block mentioned is thus a polyoxyethylene block which may optionally also have certain proportions of propylene oxide and/or butylene oxide units, preferably a pure polyoxyethylene block.

$R^6$ in formula (II) or (III) or (IV) is an aliphatic and/or aromatic, straight-chain or branched hydrocarbyl radical having 8 to 40 carbon atoms, preferably 12 to 32 carbon atoms. In a preferred embodiment, $R^6$ may comprise n-alkyl groups such as n-octyl, n-decyl or n-dodecyl groups, phenyl groups, and especially substituted phenyl groups. Substituents on the phenyl groups may be alkyl groups, for example $C_1$-$C_6$-alkyl groups, preferably styryl groups. Particular preference is given to a tristyrylphenyl group.

The hydrophobically associating monomers of the formulae (II) and (III) and the preparation thereof are known in principle to those skilled in the art, for example from EP 705 854 A1.

$R_A$, $R_B$, $R_C$, $R_D$, $R_E$, $R_F$ in formula (V) are each independently hydrogen or a hydrocarbyl radical containing 1 to 4 carbon atoms;

Q is a hydrocarbyl radical containing 1 to 8 carbon atoms; and $R_G$ is an hydrocarbyl radical containing 8 to 30 atoms;

X is a counterion with a negative charge.

In a preferred embodiment, X is a halide selected from the group including bromide, or chloride, iodide, fluoride. However, X may also be any other suitable counterion.

$R_a$, $R_b$ and $R_c$ in formula (VI) are each independently selected as hydrogen or a hydrocarbyl radical containing 1 to 4 carbon atoms.

$R_d$ in formula (VI) may be selected as a saturated or unsaturated alkyl containing 4 to 18 carbon atoms.

G in formula (VI) is $-O-$ or $-NH-$.

In a preferred embodiment, at least 50% by weight, preferably at least 80% by weight, of the hydrophobically associating monomers are monomers C of the general formula (I), (IA), (II), (Ill), (IV), (V) and (VI), and particular preference is given to using only monomers C of the general formula (I), (II), (III), (IV), (V) and/or (VI) as hydrophobically associating monomers in the inventive copolymer. Particular preference is given to using only mononomers C of the general formula (I) as the hydrophobically associating monomers to prepare the copolymers used according to the present invention.

In a preferred embodiment, the amount of the monoethylenically unsaturated, hydrophobically associating monomers C is from about 0.1 to about 15% by weight, based on the total amount of all monomers in the copolymer, preferably from about 0.1 to about 10% by weight, more preferably from about 0.2 to about 5% by weight and even more preferably from about 0.5 to about 2% by weight.

In another preferred embodiment, the copolymer used according of the present invention comprises from about 0.1 to about 15% by wt. and preferably from about 0.5 to about 4% by wt. at least one monomer C, wherein the % by wt. is based on the total weight of all monomers in the copolymer.

In another preferred embodiment, the hydrophobically associating copolymer used according to the present invention further comprises monomer units derived from at least one anionic monoethylenically unsaturated, hydrophilic monomer A. In a preferred embodiment, the at least one monomer A comprises at least one group selected from the group consisting of $-COOH$, $-SO_3H$, $-PO_3H_2$, salts thereof and mixtures of any of the foregoing.

Examples of Monomer A comprising $-COOH$ groups include, but are not limited to, acrylic acid, methacrylic acid, crotonic acid, itaconic acid, maleic acid or fumaric acid. In one embodiment, the Monomer A comprising $-COOH$ groups comprises crotonic acid, itaconic acid maleic acid or fumaric acid.

Examples of monomers A comprising sulfonic acid groups include vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid. Preference is given to vinylsulfonic acid, allylsulfonic acid or 2-acrylamido-2-methylpropanesulfonic acid.

In a preferred embodiment, the at least one monomer A is 2-acrylamido-2-methyl-propane sulfonic acid (AMPS or ATBS).

Examples of monomers A comprising phosphonic acid groups comprise vinylphosphonic acid, allylphosphonic acid, N-acrylamidoalkylphosphonic acids, N-methacrylamidoalkylphosphonic acids acryloyloxyalkylphosphonic acids, methacryloyloxyalkylphosphonic acids, preference being given to vinylphosphonic acid.

In one preferred embodiment, the copolymer used according to the present invention comprises monomer units derived from at least one unsaturated, hydrophobically associating monomer C and at least one anionic monoethylenically unsaturated, hydrophilic monomer A.

In another preferred embodiment, the hydrophobically associating copolymer used according to the present invention further comprises monomer units derived from at least one uncharged, monoethylenically unsaturated hydrophilic monomer B. It is even more preferred that the copolymer comprises monomer units derived from at least one unsaturated, hydrophobically associating monomer C and at least one uncharged, monoethylenically unsaturated hydrophilic monomer B.

In a preferred embodiment, the monoethylenically unsaturated, hydrophilic monomer B is selected from the group consisting of acrylamide, methacrylamide, N-methyl acrylamide, N-methyl methacrylamide, N,N'-dimethyl acrylamide, N,N'-dimethyl methacrylamide, N-methylol-acrylamide N-methylol methacrylamide, uncharged vinylamides such as vinylformamide or N-vinylpyrrolidone; and mixtures thereof. Preference is given to acrylamide or methacrylamide, especially acrylamide. In a preferred embodiment, when mixtures of different monomers B are used, at least 50 mol % of the monomers B should be acrylamide or methacrylamide, and preferably acrylamide.

In a preferred embodiment, the hydrophobically associating copolymer comprises monomer units derived from
i. at least one anionic monoethylenically unsaturated, hydrophilic monomer A,
ii. at least one uncharged, monoethylenically unsaturated hydrophilic monomer B, and
iii. at least one unsaturated, hydrophobically associating monomer C.

The monomers may of course also be the salts of the anionic acidic monomers. Suitable counterions comprise especially alkali metal ions such as $Li^+$, $Na^+$ or $K^+$, and ammonium ions such as $NH_4^+$ or ammonium ions with organic radicals.

It is preferred that in a copoylmer comprising monomer units derived from Monomers A and B, Monomer A and B are miscible with water in any ratio, but it is sufficient for execution of the invention that the inventive copolymer possesses the water solubility mentioned at the outset. In a preferred embodiment, the solubility of the monomers A and B in water at room temperature should be at least 50 g/l, preferably at least 150 g/l and more preferably at least 250 g/l.

In a preferred embodiment, monomer A is AMPS and/or monomer B is acrylamide.

In yet another preferred embodiment, the copolymer comprises about 2% by wt. at least one monomer C, about 48% by wt. at least one monomer A and about 50% by wt. at least one monomer B, wherein monomer A is preferably AMPS and/or monomer B is preferably acrylamide. The % by weight is in each case based on the total weight of monomers in the copolymer.

In one embodiment, the copolymer used according to the present invention has been made by polymerisation of the monomer blend in the presence of at least one branching agent. The branching agent may cause covalent or ionic cross linking through pendant groups, (e.g., by use of a glycidyl ether or multivalent metal salt) but preferably the branching agent is a diethylenically unsaturated monomeric branching agent. The amount of branching agent is preferably in the range of from about 2 to about 200 ppm and more preferably from about 10 to about 100 ppm. The ppm values are based on the total weight of the copolymer.

In a preferred embodiment, the at least one branching agent is selected from methylene bis acrylamide (MBA) and tetra allyl ammonium chloride (TAAC) or combinations thereof.

In one embodiment, the copolymer does not comprise monomers derived from monomers C of formula (V) or (VI).

In another preferred embodiment, the copolymer does not comprise monomers derived from Rosin or derivatives thereof. Rosin is a solid form of resin obtained from pines and some other plans, mostly conifers, produced by heating fresh liquid resin to vaporize the volatile liquid terpene components. It essentially consists of abietic acid. Common derivatives of Rosin are, for example, esters of Rosin compounds. Examples of Rosin and derivatives thereof are CAS No. 8050-08-7, CAS No. 65997-06-0, CAS No. 68425-08-1, CAS No. 61790-50-9, CAS No. 61790-51-0 and CAS No. 68783-82-4.

In another preferred embodiment, the copolymer according to the present invention does not comprise a polyamide polyamine chain as a side chain.

In another preferred embodiment, the copolymer according to the present invention does not comprise a COOH or $COO^-$ residue as a side chain. Thus, in this embodiment, the copolymer according to the present invention is not derived from monomers of acrylic acid and/or methacrylic acid.

In a preferred embodiment of the present invention, the copolymer is used for pelletizing of metal containing ore wherein the metal containing ore is selected from the group of Fe containing ore, Cu containing ore, Mo containing ore, Ni containing ore, Cr containing ore or mixtures thereof and preferably is Fe containing ore. In a particularly preferred embodiment, the Fe containing ore comprises magnetite, hematite or goethite or combinations thereof.

The present invention also relates to compositions comprising a hydrophobically associative copolymer as described above and a pelletization aid and/or a water soluble treatment polymer.

In a preferred embodiment, the inventive composition further comprises at least one metal containing ore as described above. Thus, the composition according to the present invention may be a metal containing ore pelletization composition for pelletization.

In a preferred embodiment, the pelletizing aid is a water soluble material selected from the group consisting of sodium carbonate, sodium bicarbonate, sodium silicate, sodium phosphate, sodium stearate, sodium benzoate, sodium tartrate, sodium oxalate, sodium citrate, sodium acetate, the corresponding ammonium, potassium, calcium and magnesium salts of the preceding sodium salts, urea and calcium oxide.

In a more preferred embodiment, the pelletizing aid comprises sodium carbonate.

In another preferred embodiment, the weight ratio of copolymer to pelletizing aid is generally in the range of from about 5:1 to about 1:5 and more preferably from about 2:1 to about 1:2, by weight.

The ratio of copolymer to treatment polymer is generally in the range of from about 10:1 to about 1:2 and preferably from about 5:1 to about 1:1, by weight.

In another preferred embodiment, the water soluble treatment polymer has a molecular weight ($M_w$) of about 1,000 to about 20,000. It is further preferred that the treatment polymer is a synthetic polymer formed by polymerisation of water soluble ethylenically unsaturated anionic monomer or water soluble ethylenically unsaturated monomer blend containing at least 50% by weight anionic monomer.

The treatment polymer is generally formed of from about 50 to about 100% by weight, preferably from about 75 to 100% by weight and even more preferably from about 80 to 100% by weight anionic monomer with the balance being non-ionic monomer which will form a water soluble blend with the anionic monomer. The non-ionic monomer can be a water soluble monomer such as acrylamide or it can be a potentially water insoluble monomer such as an alkyl acrylate or methacrylate, for instance methyl or butyl acrylate, provided that this insoluble monomer can be dissolved in an aqueous solution of the anionic monomer during polymerisation and that the blend provides a water soluble polymer.

The anionic monomer is generally ethylenically unsaturated carboxylic monomer, usually in the form of an alkali metal (especially sodium) or other water soluble salt, but if desired some or all of the anionic monomer can be an ethylenically unsaturated sulphonic monomer such as AMPS or allyl sulphonate or vinyl sulphonate. The preferred carboxylic monomers are acrylic or methacrylic acid and most preferably the anionic monomer is sodium acrylate. The preferred treatment polymers are homopolymers of acrylic acid (usually as sodium polyacrylate).

The molecular weight of the treatment polymer is preferably at least 2,000 or 3,000. Often it is below 10,000 and preferably below 8,000, with values of around 3,000 to 6,000 often being preferred, wherein the molecular weight is preferably the weight average molecular weight ($M_w$). The molecular weight may be measured by gel permeation chromatography, preferably measured by size exclusion chromatography using Toao Haes TSK PWXL (G6000+G3000+guard) columns or other suitable columns, e.g. using dipotassium hydrogen orthophosphate trihydrate as eluant, and several sodium polyacrylate standards in the range 782200-1250 g/mol and sodium acrylate monomers as an additional standard. Molecular weights may be measured as the full sodium salt.

Preferred treatment polymers also have narrow molecular weight distributions in addition to the defined very low molecular weight.

Higher molecular weights within the range of 1,000 to 20,000 are sometimes more suitable for the treatment polymers when, as is sometimes preferred, the treatment polymer is to be introduced in bead form. When the treatment polymer is to be supplied in liquid form, the treatment polymer is usually made by solution polymerisation in conventional manner. When the treatment polymer is supplied in powder form, the polymer is usually made by reverse phase bead polymerisation or by spray drying a solution of the polymer.

If the treatment polymer is in particulate form, it generally has a particle size at least 90% by weight below 300 μm and most preferably below 200 μm and often below 100 μm. Usually the particle size is at least 90% by weight above 10 μm. For example, the particle size may be determined by sieving or laser granulometry.

It will be appreciated that the water soluble treatment polymers used in the invention are materials which are known in the industry as dispersing agents. It may be possible to obtain improved dry strength by the incorporation of the treatment polymer in the inventive composition. Further, this may preferably be achieved when the total amount of binding system (copolymer, treatment polymer and/or pelletization aid) remains constant in the inventive composition.

The amount of treatment polymer which has to be added to the inventive composition will vary according to the nature of the ore and the remainder of the binder system but is often at least 0.005% by wt. and most preferably is at least 0.008% by wt. Often it is in the range from about 0.01 to about 0.05% by wt. Amounts above 0.1% by wt. are usually unnecessary but can be used if desired. The % by wt. are based on the intimate mixture composition comprising metal containing ore, copolymer and moisture.

The treatment polymer may be incorporated in the intimate mixture of ore, binder polymer and moisture by addition at any suitable stage. It is often desirable to mix the treatment polymer intimately with the ore and some or all of the moisture before adding the binder polymer or other components of the binder system. For instance the treatment polymer can be added as a liquid or powder prior to the filters which conventionally precede the addition to binder prior to pelletization in a drum or disc.

In one embodiment, the treatment polymer and copolymer are generally added separately, that is to say from separate supplies, either simultaneously or sequentially in either order. This facilitates the possibility of adding the treatment and copolymers in different physical forms, for instance the treatment polymer as a solution and the binder polymer as a powder. In particular the treatment polymer may be added as a solution before filters and the copolymer as a powder after the filters but before pelletization.

Although it is often convenient to add the treatment polymer as a solution, it is usually preferred to add it as a powder. The powder particles may be added separately from the copolymer (often at the same time as the binder polymer) but often the treatment polymer particles may be added as a blend with copolymer particles.

Instead of adding the treatment polymer as a solution or a blend of particles with particles of copolymer, some of the treatment polymer can serve also as an aggregate bonding agent for aggregates of polymer binder particles, as in EP 376,713. However it is necessary that those aggregates should be disintegratable, as described in EP 376,713, and it is not usually practicable to make disintegratable aggregates containing both the copolymer and all the desired treatment polymer. Accordingly if the copolymer is to be introduced in the form of aggregates it is usually preferred that these do not include treatment polymer as a bonding agent and usually it is preferred that they do not contain any treatment polymer or, if they do, the amount of treatment polymer in the aggregates should be not more than 50%, and generally not more than 10%, by weight of the total amount of treatment polymer used in the invention.

If desired, the composition according to the present invention may further comprise bentonite as an additional binder.

In one embodiment, the inventive composition comprises from about 0 to about 60% by wt. pelletization aid, from about 0 to about 50% by wt. treatment polymer and at least 30% by weight of copolymer, wherein the total wt % of the composition adds up to 100%. In a preferred embodiment, the pelletization aid is sodium carbonate and/or the treatment polymer is polyacrylate.

The present disclosure also relates to the use of a copolymer for pelletizing of metal containing ore, wherein the copolymer comprises monomer units derived from at least one anionic monoethylenically unsaturated, hydrophilic monomer A and wherein the at least one monomer A comprises at least one group selected from the group consisting of —$SO_3H$, —$PO_3H_2$, salts thereof and mixtures of any of the foregoing. Examples of monomers A comprising sulfonic acid groups include vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid.

Preference is given to vinylsulfonic acid, allylsulfonic acid or 2-acrylamido-2-methylpropanesulfonic acid. Preferably the at least one monomer A is 2-acrylamido-2-methylpropane sulfonic acid (AMPS or ATBS). Examples of monomers A comprising phosphonic acid groups comprise vinylphosphonic acid, allylphosphonic acid, N-acrylamidoalkylphosphonic acids, N-methacrylamidoalkylphosphonic acids acryloyloxyalkylphosphonic acids, methacryloyloxyalkylphosphonic acids, preference being given to vinylphosphonic acid. In another preferred embodiment, the copolymer further comprises monomer units derived from at least one uncharged monoethylenically unsaturated hydrophilic monomer B. In yet another preferred embodiment, the copolymer comprises at least one uncharged, monoethylenically unsaturated, hydrophilic monomer B is selected from the group consisting of acrylamide, methacrylamide, N-methyl acrylamide, N-methyl methacrylamide, N,N'-dimethyl acrylamide, N,N'-dimethyl methacrylamide, N-methylol acrylamide, N-methylol methacrylamide, uncharged vinylamides such as vinylformamide or N-vinylpyrrolidone; and mixtures thereof. Preference is given to acrylamide or methacrylamide, especially acrylamide. In a preferred embodiment, when mixtures of different monomers B are used, at least 50 mol % of the monomers B should be acrylamide or methacrylamide, and preferably acrylamide. It is preferred that Monomer A and B are miscible with water in any ratio, but it is sufficient for execution of the invention that the inventive copolymer possesses the water solubility mentioned at the outset. In a preferred embodiment, the solubility of the monomers A and B in water at room temperature should be at least 50 g/l, preferably at least 150 g/l and more preferably at least 250 g/l. The copolymer preferably comprises from about 10 to about 50% by wt. monomer units derived from at least one monomer A and from about 50 to about 90% by wt. monomer units derived from at least one monomer B. In this embodiment, the % by wt. is based on the total weight of monomer units.

The present disclosure also pertains to an embodiment, wherein the copolymer comprises monomer units derived from about 10% by wt. of at least one monomer A and about 90% by wt. of at least one monomer B. In this embodiment, the % by wt. is based on the total weight of monomer units. In a preferred embodiment thereof, monomer A is preferably AMPS and/or monomer B is acrylamide.

In the scope of the present invention, "hydrophilic" means that a corresponding solid "hydrophilic particle" has a contact angle of water against air of <90°.

Methods to determine the contact angle are well known to the skilled artisan. For example, for the determination of the contact angle against water may be determined by optical drop shape analysis, e.g. using a DSA 100 contact angle measuring device of Krüsse (Hamburg, Germany) with the respective software. Typically 5 to 10 independent measurements are performed in order to determine a reliable average contact angle.

As used herein, the term "ore" or "metal containing ore" refers to a naturally occurring substance that is solid inorganic and representable by a chemical formula, which is usually abiogenic and may have an ordered atomic structure. Examples of metal-containing ores include, but are not limited to, sulfides, oxides, halides, carbonates, sulfates, and phosphates of valuable metals such as Ag, Au, Pt, Pd, Rh, Ru, Ir, Os, Cu, Mo, Ni, Cr, Mn, Zn, Pb, Te, Sn, Hg, Re, V, Fe or mixtures thereof. Preferred metal containing ores are Fe containing ores. Examples of Fe containing ores include, but are not limited to, magnetite, hematite and goethite.

As used herein, the term "monoethylenically unsaturated" as in "monoethylenically unsaturated monomer" refers to an organic compound that contains a —C=C— bond. Preferably, the monoethylenically unsaturated compound contains exactly one —C=C— bond. In the context of a "monoethylenically unsaturated monomer", it is meant that the monomer preferably contains a functional —C=C— group for polymerisation.

As used herein, the term "diethylenically unsaturated" as in a "diethylenically unsaturated monomeric branching agent" means that a compounds contains two —C=C— bonds which are preferably functional groups for polymerisation, respectively.

As used herein, the term "anionic" as in "anionic monomer" refers to a negatively charged compound, such as an anionic monomer. However, the term "anionic monomer" as used herein also includes to respective salt comprising the negatively charged anionic monomer and the respective free acid of the anionic monomer, i.e. the negatively charged anionic monomer bound to hydrogen. Examples of anionic monomers thus include monomers containing at least one group selected from —COOH, —$SO_3H$, —$PO_3H_2$, or —$COO^-$, —$SO_3^-$, —$PO_3H^-$ or salts thereof. Other examples of anionic monomers include, but are not limited to, vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, and salts thereof.

As used herein, the term "uncharged" as in "uncharged monomer", refers to a compound that does typically not dissociate into anions and cations in significant amounts under standard conditions such as in water at room temperature. In the context of uncharged monomers, this means that the monomers may comprise respective functional groups such as amide groups. Thus, examples of uncharged monomers include, but are not limited to, acrylamide, methacrylamide, N-methyl methacrylamide, N-methyl acrylamide, N,N'-dimethyl acrylamide, N,N'-dimethyl methacrylamide, N-methylol acrylamide, N-methylolmethacrylamide or mixtures thereof. It is emphasized that free acids, e.g a compound containing a COOH, —503H or —$PO_3H_2$ group is not considered as uncharged according to the present invention but as anionic.

As used herein, the term "synthetic polymer" refers to a polymer that had been chemically synthesized, i.e. a human-made polymer. Typically the term synthetic polymer includes thermoplastics, thermosets, elastomers and synthetic fibers. The back bones of common synthetic polymers such as polythene and polystyrene, poly acrylates are made up of carbon-carbon bonds, whereas hetero chain polymers such as polyamides, polyesters, polyurethanes polysulfides and polycarbonates have other elements (e.g. oxygen, sulfur, nitrogen) inserted along the backbone. Also silicon form similar materials without the need of carbon atoms, such as silicones through siloxane linkages; these compounds are thus said to be inorganic polymers. Coordination polymers may contain a range of metals in the backbone, with non-covalent bonding present. The opposite of a synthetic polymer is a naturally occurring polymer such as cellulose.

As used herein, the term "water soluble polymer" refers to polymers having polar or charged functional groups, rendering them soluble in water.

As used herein, the term "Drop number" means the number of the repeated drop of 9-16 mm wet pellets onto a steel plate from a height of 45 cm without any cracks on the wet pellets. The drop number measures the ability of the wet pellets to retain their shape during transfer operations.

As used herein, the term "wet strength" is a measure of how much load a wet pellet can bear and it is determined by applying pressure onto a wet pellet until it cracks and the maximum load is recorded.

As used herein, the term "dry strength" is a measure of how much load a dry pellet can bear. Typically wet pellets may be dried, e.g. for 3 hours at 110° C., and the dried pellet is crushed and the maximum load is recorded. The dry strength may be considered as a measure of the ability of dried pellets to survive handling during the firing process.

As used herein, the term "hydrophobically associating copolymer" comprises a water-soluble copolymer which, as well as hydrophilic molecular components which ensure sufficient water solubility, has lateral or terminal hydrophobic groups. In aqueous solution, the hydrophobic groups of the polymer can associate with themselves or with other substances having hydrophobic groups due to intermolecular forces. This gives rise to a polymeric network joined by intermolecular forces, which thickens the aqueous medium.

As used herein, the term "hydrocarbyl" or "carbon radical" refers to an aliphatic and/or aromatic, linear or branched carbon radical. Hydrocarbyl radicals such as "hydrocarbyl radical containing 2 to 50 carbon atoms", and the like thus refer to an aliphatic and/or aromatic, linear or branched carbon radicals that contain 2 to 50 carbon atoms. For example, a hydrocarbyl radical containing 2 carbon atoms is ethyl, a hydrocarbyl radical containing 4 carbon atoms comprises n-butyl, isobutyl and/or tert-butyl.

Preference is given to aliphatic radicals. Examples of aliphatic radicals include, but are not limited to methyl, ethyl, propyl, isopropyl, n-butyl, isobutyl, tert-butyl, pentyl, in particular n-pentyl, isopentyl, tert-pentyl, n-hexyl, isohexyl, tert-hexyl, n-heptyl, isoheptyl, tert-heptyl, n-octyl, isooctyl, tert-octyl, nonyl, n-nonyl, isononyl, tert-nonyl, n-decyl, isodecyl, tert-decyl, undecyl, n-undecyl, isoundecyl, tert-undecyl, or dodecyl, n-dodecyl, isododecyl or tert-dodecyl. Particular preference is given to an aliphatic unbranched hydrocarbyl radical, preferably having 2 or 3 carbon atoms, i.e. ethyl or propyl.

Further examples of aliphatic branched carbon radicals include cyclic hydrocarbons such as mono-, bi- or tricyclic saturated or unsaturated hydrocarbons having from 6 to 30 carbon atoms. Examples include, but are not limited to cyclohexyl, cecloheptyl, cyclooctyl, cyclononyl, cyclodecyl, cycloundecyl and cyclododecyl.

Examples of aromatic carbon radicals include, but are not limited to aromatic carbocyclic rings of 6 to 30 ring members, including both mono, bi-, and tri-cyclic ring systems. Non-limiting examples include -indenyl, -phenyl, -naphthyl-, acenaphthyl-antranyl, -phenanthryl and the like.

As used herein, the term "saturated alkyl" comprises linear or branched aliphatic hydrocarbyl as described above.

As used herein, the term "unsaturated alkyl" refers to a straight chain or branched non-cyclic aliphatic hydrocarbyl including at least one carbon-carbon double bond. An unsaturated alkyl containing 4 to 18 carbon atoms thus includes, for example, -1-butenyl, -2-butenyl-, isobutylenly, -1-pentenyl, -2-pentenyl, -3-methyl-1-butenyl, -2-methyl-2-butenyl, and the like.

As used herein, the term "pelletizing aid" refers to a compound that assists in the pelletization of of metal containing ore when used together with the copolymer according to the present invention. The pelletizing aid is preferably a water soluble, monomeric material. Examples of pelletizing aids are described in and suitable materials are described in EP 225 171 and EP 288 150, U.S. Pat. Nos. 4,767,449 and 4,802,914.

The term "about" in the context of the present application as e.g. in "about 50% by wt." means that the value recited immediately after the "about" means that the term also comprises minor diviations from the exact numeric value, e.g. due to weighing errors etc. In a preferred embodiment, the term "about" means a value within 15% (±15%) of the value recited immediately after the term "about," including any numeric value within this range, the value equal to the upper limit (i.e., +15%) and the value equal to the lower limit (i.e., −15%) of this range. For example, the phrase "about 100" encompasses any numeric value that is between 85 and 115, including 85 and 115 (with the exception of "about 100%", which always has an upper limit of 100%). In one aspect, "about" means±10%, even more preferably ±5%, even more preferably ±1% or less than ±1%. In another preferred embodiment, the term "about" as in "about 50% by wt." means a value of 50% by wt.±1% by wt or 50% by wt.±0.5% by wt.

Examples 1: Preparation of Co-Polymers

The preparation of copolymers was done by adiabatic gel polymerization in aqueous solution.

Example 1: Iron Ore Concentrate Pelletization and Pellet Analysis

A magnetite ore having around 10% moisture (9.3 to 9.7%) was blended with a powdered premix of binder formulation, using a mixer machine brand Eirich model EL1, for three minutes. The composition of the respective pellets are summarized in Table 2.1. The resultant intimate mixture was subjected to pelletization by using an inclined pelletizing disk of 60 cm diameter, rotating at a speed of 33 rpm. The produced pellets had a size between 9.4 to 13.4 mm. Dry pellets were produced after drying for 3 hours at 110° C. The strength of wet and dry pellets was determined using a Chatillon digital strength gauge. A total of 25 pellets were pressed in uniaxial direction and the maximum compressive strength recorded when the pellets were crushed. To determine the Drop number, wet pellets were repeatedly dropped onto a steel plate from a height of 45 cm and inspected for any visible crack. The average number of drops until a crack was detected was recorded as Drop number.

The following binder formulations were used for iron ore pelletization:

Alcotac® FE 13 (BASF SE) is a commercially available organic binder for iron ore pelletization comprising a co-polymer of acrylamide and acrylate monomers.

Formulation 1 is comprised of a hydrophobically associating copolymer based on the monomers Acrylamide (50 wt. %), Na-AMPS (48 wt. %) and an associative monomer type 1, sodium carbonate and sodium polyacrylate homopolymer of average molecular weight of from about 4,000 to about 5,000. The associative monomer type 1 is $CH_2=CH-O-CH_2-CH_2-CH_2-CH_2-O-(EO)_n-(PeO)_m-H$, wherein n is 24-25 and m is about 10; EO is ethyleneoxide and PeO is pentyleneoxide.

The binder formulation and the average results are shown in the following table 1.1.

TABLE 1.1 composition and analysis of iron ore pellets

| Test | Alcotac FE13 [wt. %]* | Formulation 1 [wt. %]* | Wet strength [N] | Dry strength [N] | Drop Number |
|---|---|---|---|---|---|
| A (comparative) | 0.03 | | 17.0 | 28.0 | 7.0 |
| B (inventive) | | 0.03 | 19.6 | 35.0 | 8.2 |

*wt. % is based on total weight of iron ore pellet.

The pellets comprising the formulations according to the present invention showed an increased wet and dry strength and a higher drop number compared to the pellets comprising the commercially available polymer-based binder formulation.

Example 2: Iron Ore Concentrate Pelletization Using Bentonite in Combination with Organic Binder Following the same pelletization experimental procedure as described in the previous Example 1, binder compositions comprising bentonite together with binder formulations according to the present invention were tested.

The binder formulations 3, 4 and 5 were used for iron ore pelletization in combination with Bentonite.

Formulation 3 was comprised of a hydrophobically associating copolymer based on the monomers acrylamide (50 wt. %), Na-AMPS (48 wt. %) and the associative monomer type 1; and a sodium polyacrylate homopolymer of average molecular weight of from about 4,000 to about 5,000. The formulation comprised 50 wt. % of the copolymer and 50 wt. % of the sodium polyacrylate homopolymer.

Formulation 4 was comprised of a hydrophobically associating copolymer based on the monomers acrylamide (50 wt. %), Na-AMPS (48 wt. %) and the associative monomer type 1, and sodium carbonate. The formulation comprised 50 wt. % of the copolymer and 50 wt. % of sodium carbonate.

Formulation 5 was comprised of a hydrophobically associating copolymer based on the monomers sodium acrylate (30 wt. %), acrylamide (68 wt. %) and the associative monomer type 1; and a sodium polyacrylate homopolymer of average molecular weight of from about 4,000 to about 5,000. The relative proportion of copolymer and polyacrylate homopolymer was 50 wt. % of each component in the formulation.

TABLE 2.1 composition and analysis of iron ore pellets using bentonite or compositions of bentonite with inventive copolymer binders

| Test | Bentonite [wt. %]* | Formulation 3 [wt. %]* | Formulation 4 [wt. %]* | Formulation 5 [wt. %]* | Wet strength [N] | Dry strength [N] | Drop Number |
|---|---|---|---|---|---|---|---|
| D (comparative) | 0.7 | | | | 15.0 | 57 | 10 |
| E (inventive) | 0.3 | 0.02 | | | 12.0 | 62 | 10 |
| F (inventive) | 0.3 | | 0.02 | | 9.0 | 61 | 10 |
| G (inventive) | 0.3 | | | 0.02 | 20 | 61 | 9.8 |

*wt. % is based on total weight of iron ore pellet.

The pellets comprising the formulations according to the present invention and a low amount of bentonite provided similar dry strengths and drop numbers compared to those obtained from pellets produced using bentonite alone as binder in higher amounts.

The invention claimed is:
1. A process, comprising:
pelletizing a metal comprising ore in contact with a hydrophobically associating copolymer,
wherein the hydrophobically associating copolymer comprises, in polymerized form, a monomer (C) having a formula (I), formula (III), and/or (V):

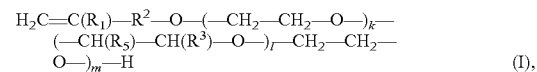
(I),

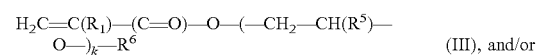
(III), and/or

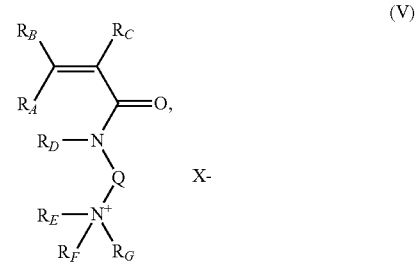
(V)

wherein
k is a number from 10 to 150;
l is a number from 5 to 20;
m is a number from 0 to 30;
$R^1$ is H or methyl;
$R^2$ is a single bond or a divalent linking group of formula $-(CH_2)_n-$ and $-O-(CH_2)_{n'}-$, n being a natural number from 1 to 6 and n' being a natural number from 2 to 6;
$R^3$ and $R^5$ are independently H, a hydrocarbyl radical comprising 1 to 6 carbon atoms, or an ether group of formula —CH$_2$—O—R$^{3'}$, R$^{3'}$ being a hydrocarbyl radical comprising at least 2 carbon atoms;

R$^{5'}$ is H, methyl or ethyl;

R$^6$ is a hydrocarbyl radical comprising 8 to 40 carbon atoms;

R$_A$, R$_B$, R$_C$, R$_D$, R$_E$, R$_F$ are independently H or a hydrocarbyl radical comprising 1 to 4 carbon atoms;

Q is a hydrocarbylene radical comprising 1 to 8 carbon atoms;

X is a counterion with a negative charge; and

R$_G$ is a hydrocarbyl radical comprising 8 to 30 atoms, wherein a sum total of carbon atoms in all hydrocarbyl radicals R$^3$ or R$^{3'}$ and R$^5$ is in a range from 10 to 50, wherein the monomer (C) has the formula (I) and is a mixture comprising a first monomer C of the formula (I) wherein m is 0 and a second monomer (C) of the formula (I) wherein m is in the range of from 1 to 15, and wherein the weight ratio of the first to second monomer (C) of the formula (I) is in the range from 19:1 to 1:19.

2. The process of claim 1, wherein the monomer (C) further comprises a monomer of formula (IV) or (VI):

(IV),

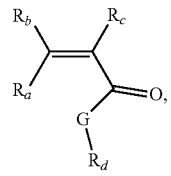

(VI)

wherein

R$^1$ is H or methyl;

R$^6$ is independently an aliphatic and/or aromatic, straight-chain or branched hydrocarbyl radical having 8 to 40 carbon atoms;

R$_a$, R$_b$, and R$_c$ are independently H or a hydrocarbyl radical comprising 1 to 4 carbon atoms;

R$_d$ is a hydrocarbyl radical comprising 4 to 18 carbon atoms; and

G is —O— or —NH—.

3. The process of claim 1, wherein the monomer (C) has the formula (I), wherein:

k is in the range of from 23 to 26;

l is in the range of from 8.5 to 17.25; and m is in the range of from 0 to 15.

4. The process of claim 1, wherein the hydrophobically associating copolymer further comprises, in polymerized form, an anionic monoethylenically unsaturated, hydrophilic monomer (A).

5. The process of claim 4, wherein the monomer (A) comprises —COOH, a salt of —COOH, —SO$_3$H, a salt of —SO$_3$H, —PO$_3$H$_2$, and/or a salt of —PO$_3$H$_2$.

6. The process of claim 5, wherein the monomer (A) is 2-acrylamido-2-methyl-propane sulfonic acid (AMPS) or a salt thereof.

7. The process of claim 1, wherein the hydrophobically associating copolymer further comprises, in polymerized form, an uncharged, monoethylenically unsaturated hydrophilic monomer (B).

8. The process of claim 1, wherein the hydrophobically associating copolymer further comprises, in polymerized form:

an anionic monoethylenically unsaturated, hydrophilic monomer (A); and an uncharged, monoethylenically unsaturated hydrophilic monomer (B).

9. The process of claim 7, wherein the monomer (B) comprises an acrylamide, methacrylamide, N-methyl methacrylamide, N-methyl acrylamide, N,N'-dimethyl acrylamide, N,N'-dimethyl methacrylamide, N-methylol acrylamide, N-methylolmethacrylanude, and/or uncharged vinylamide.

10. The process of claim 1, wherein the copolymer comprises about 0.1 to about 15 wt. % of the monomer (C).

11. The process of claim 8, wherein the copolymer comprises about 2 wt. % of the monomer (C), about 48 wt. % of the monomer (A) and about 50 wt. % of at monomer (B).

12. The process of claim 1, wherein the copolymer has been made by polymerization of the monomer blend in the presence of at least one branching agent.

13. The process of claim 1, wherein the molecular weight of the copolymer is at least 300,000 Da.

14. The process of claim 1, wherein the copolymer is water-soluble.

15. The process of claim 1, wherein the copolymer does not comprise, in polymerized form, the monomer (C) of the formula (V) or a monomer (C) of formula (VI)

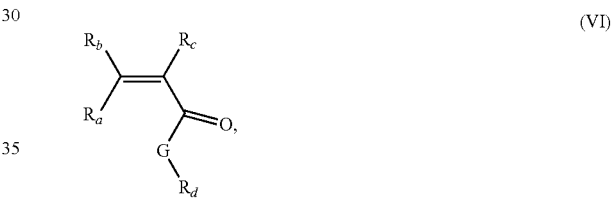

wherein

R$_a$, R$_b$, R$_c$ are independently H or a hydrocarbyl radical comprising 1 to 4 carbon atoms;

R$_d$ is a hydrocarbyl radical comprising 4 to 18 carbon atoms; and

G is —O— or —NH—.

16. The process of claim 1, wherein the metal containing ore comprises Fe, Cu, Mo, Ni, and/or Cr.

17. A composition suitable for pelletizing a metal comprising ore, the composition comprising:

(i) a hydrophobically associating copolymer; and (ii) a pelletization aid and/or a water soluble treatment polymer, wherein the pelletization aid is a water soluble material comprising sodium carbonate, sodium bicarbonate, sodium silicate, sodium phosphate, sodium stearate, sodium benzoate, sodium tartrate, sodium oxalate, sodium citrate, sodium acetate, the corresponding ammonium, potassium, calcium and magnesium salts of the preceding sodium salts, urea, and/or calcium oxide, and wherein the water soluble treatment polymer has molecular weight of from about 1,000 to about 20,000 and is a synthetic polymer formed by polymerization of water soluble ethylenically unsaturated anionic monomer or water soluble ethylenically unsaturated monomer blend comprising at least 50% by weight anionic monomer, wherein the hydrophobically associating copolymer comprises, in polymerized form, a first and a second monomer (C) independently having a formula (I):

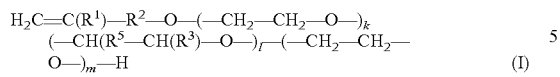

(I)

wherein k is a number in a range of from 10 to 150;
l is a number in a range of from 5 to 20;
$R^1$ is H or methyl;
$R^2$ is a single bond or a divalent linking group of formula —$(CH_2)_n$— and —O—$(CH_2)_{n'}$—, n being a natural number from 1 to 6 and n' being a natural number from 2 to 6,
$R^3$ and $R^5$ are independently H, a hydrocarbyl radical comprising 1 to 6 carbon atoms, or an ether group of formula —$CH_2$—O—$R^{3'}$, $R^{3'}$ being a hydrocarbyl radical comprising at least 2 carbon atoms, and
wherein, in the first monomer (C), m is 0, and, in the second monomer (C), m is in a range of from 1 to 15.

* * * * *